(12) United States Patent
McVicker

(10) Patent No.: US 7,438,845 B2
(45) Date of Patent: Oct. 21, 2008

(54) METHOD FOR MANUFACTURING ARTICLE WITH INTEGRALLY FORMED HOOKS WITH SHEAR AT HOOK-BEARING SURFACE

(75) Inventor: Henry J. McVicker, Naples, FL (US)

(73) Assignee: Inter-Mold, LLC, Naples, FL (US)

( * ) Notice: Subject to any disclaimer, the term of this patent is extended or adjusted under 35 U.S.C. 154(b) by 555 days.

(21) Appl. No.: 10/786,317

(22) Filed: Feb. 25, 2004

(65) Prior Publication Data

US 2005/0186386 A1   Aug. 25, 2005

(51) Int. Cl.
  *B29C 45/03*  (2006.01)
  *B29C 43/02*  (2006.01)
  *B29C 49/00*  (2006.01)

(52) U.S. Cl. .............. 264/318; 264/328.1; 264/334; 264/337; 425/441; 425/DIG. 58

(58) Field of Classification Search ............... None
  See application file for complete search history.

(56) References Cited

U.S. PATENT DOCUMENTS

| | | | |
|---|---|---|---|
| 3,762,000 A * | 10/1973 | Menzin et al. ............ 24/452 |
| 5,656,226 A | 8/1997 | McVicker |
| 6,059,558 A * | 5/2000 | Buzzell et al. .............. 425/556 |
| 6,187,247 B1 * | 2/2001 | Buzzell et al. .............. 264/334 |
| 6,224,364 B1 * | 5/2001 | Harvey ...................... 425/130 |
| RE37,338 E | 8/2001 | McVicker |
| 6,898,804 B2 | 5/2005 | Sandler |
| 2004/0134100 A1 | 7/2004 | McVicker |
| 2004/0137192 A1 | 7/2004 | McVicker |
| 2004/0139585 A1 | 7/2004 | McVicker |
| 2004/0154083 A1 | 8/2004 | McVicker |
| 2005/0184216 A1 | 8/2005 | McVicker |

\* cited by examiner

*Primary Examiner*—Edmund H. Lee
(74) *Attorney, Agent, or Firm*—Jones Day

(57) ABSTRACT

A molded article having a field of molded hooks formed integrally thereon is made in a mold in which the hook-forming cavities are on a surface of a retractable mold insert. The insert is retracted from the molded article prior to the article's release from the mold, so that the molded hooks do not experience excessive shear forces as the article is removed from the mold cavity. The invention is especially useful when the draft angle of the hook-bearing surface of the molded article is less than about 45°.

7 Claims, 3 Drawing Sheets

METHOD FOR MANUFACTURING ARTICLE WITH INTEGRALLY FORMED HOOKS WITH SHEAR AT HOOK-BEARING SURFACE

BACKGROUND OF THE INVENTION

This invention relates to a method and apparatus for making a molded article having a field of integrally molded hooks formed on at least one surface thereof. This invention further relates to such a method and apparatus wherein a surface of the article bearing a field of integrally molded hooks could experience shear forces as the article is removed from the mold.

An injection molded article having a field of hooks formed integrally on a surface thereof and a method and apparatus for making such an article are disclosed in U.S. Pat. Nos. 5,656,226 and RE 37,338, the disclosures of which are incorporated herein by reference in their entireties. As disclosed in these references, an injection molded article has a field of injection molded hooks integrally formed on a predetermined area thereof on at least one wall during the injection molding process, the field of hooks capable of releasable attachment to a cooperative loop-bearing member. The hooks have reduced radius compared to prior art hooks and a changed geometry for promoting ejection from the mold during the injection molding process, yet still maintain the desired fastening function. The thermoplastic material used to mold the hooks has a memory sufficient to cause the hooks to return substantially to their original position after being removed from the mold, and yet has sufficient flexibility to allow the hooks to bend during removal from the mold and during engagement and release from the cooperative loop-bearing member.

As further disclosed in the references, an apparatus for making such a molded article can comprise a mold block having two sections that join together to define a cavity having the shape of the injection molded article. A recess is formed in the mold block for receiving an insert, the insert comprising plates each having hook-shaped cavities formed in an edge thereof, such that when the plates are placed in stacked relation their edges define a field of hook shaped cavities, the plate edges defining one surface of the mold insert that can be substantially contiguous with the inner surface of a section of the mold block. The plates having the hook-shaped cavities can be alternated with spacer plates having no cavities to define a field of spaced rows of hooks formed on a surface of the molded article.

In the embodiment illustrated in the references, the injection molded device is an orthopedic ankle brace, and in particular one of the shells of the brace that are disposed on either side of a patient's ankle. The field of hooks are formed on a surface of the shell, such that when the mold block is opened and the molded article is removed, the article is lifted off the mold section such that there is little or no shear experienced by the molded field of hooks, that is, the base of the field of hooks is formed on a wall of the molded article that is substantially normal to the direction in which the molded article is removed from the mold cavity. The hooks may temporarily straighten as the article is removed from the mold and the hooks are withdrawn from the insert, but the hooks almost immediately return to substantially their original shape.

In other embodiments of injection molded devices, however, the device may need to be lifted off or out of the mold in a manner such that the base of the field of hooks would not be withdrawn in a direction substantially normal to the hook-forming surface of a mold insert. The method and apparatus of U.S. Pat. Nos. 5,656,226 and RE 37,338 can be used in the molding of articles in which the draft angle experienced by the surface of the molded article bearing the field of injection molded hooks is greater than about 45°, depending on the thermoplastic material being molded. At a draft angle less than about 45°, the field of hooks can experience shear forces that can damage the hooks as they are removed from the mold. This would be the case if a wall of the finished article lies in a plane more parallel than perpendicular to the direction in which the article is withdrawn from the mold. For example, if the article to be injection molded is in the shape of a box or container, and the field of hooks is to be formed on an inner or outer side surface of the box, then when the molded box is withdrawn from the mold, the field of hooks could experience shear forces. These shear forces could be damaging to the field of injection molded hooks.

U.S. Pat. No. 6,224,364, assigned to Velcro Industries, B.V. discloses an injection molded product having an array of fastener elements integrally molded with the product, the product being molded in a closed cavity die, at least one of the parts of the die having a movable segment constructed to be retracted across the mold cavity, such that the fastener element cavities and the mold cavity can be filled under different filling conditions and molded under different conditions.

It is thus one object of the invention to provide a molded article having a field of integrally molded hooks thereon wherein the base of the field of the integrally molded hooks has a draft angle less than about 45° as the article is withdrawn from the mold.

It is another object of the invention to provide a method and apparatus for making a molded article having a field of hooks on one surface thereof, wherein the base of the field of hooks has a draft angle less than about 45° as the direction in which the article is withdrawn from the mold.

SUMMARY OF THE INVENTION

In accordance with the invention, an apparatus is provided for forming a molded article, the apparatus comprising a mold having two or more parts defining a mold cavity, the mold cavity defining the shape of a molded article having at least one wall having a field of integrally molded hooks in at least one predetermined area thereof, the mold comprising in one of its walls an insert having hook-shaped cavities therein to form the field of molded hooks, the insert being retractable prior to removal of the molded article from the mold, such that the hooks are released from the hook-shaped cavities in the mold insert prior to the article being removed from the mold. The apparatus is particularly suited to articles wherein the base of the field of hooks is on a wall of the molded article that has a draft angle less than about 45° with respect to the hook forming surface of the retractable insert.

In another aspect of the invention, a method of making a molded article having a field of integrally molded hooks formed in one surface thereof comprises the steps of providing a mold comprising two or more parts defining a mold cavity, the mold cavity defining the shape of a molded article having at least one wall having a field of integrally molded hooks in at least one predetermined area thereof, the mold comprising in one of its walls a retractable insert having hook-shaped cavities therein to form the field of molded hooks, the insert being retractable prior to removal of the molded article from the mold; molding the article in the mold cavity; retracting the retractable insert to release the hooks from the hook-shaped cavities in the mold insert; and, removing the article from the mold. The method is particularly suited to the manufacture of articles wherein the base of the field of hooks is on a wall of the molded article has a draft angle less than about 45° with respect to the hook forming surface of the retractable insert.

In yet another aspect of the invention, a molded article comprises a field of hooks integrally formed thereon, the field of hooks being formed on a surface of the article that has a draft angle less than about 45° with respect to the hook forming surface of the retractable insert.

DESCRIPTION OF A PREFERRED EMBODIMENT

The embodiment of the invention illustrated herein is in the form of a box such as the container portion of an ice chest or picnic cooler, with fields of hooks molded in the outside surfaces. It will be understood that this embodiment is presented for purposes of illustration only, and that the invention is not so limited. Other three dimensional objects can be molded in accordance with the invention, with one or more fields of molded hooks on inner and/or outer surfaces.

For purposes of this patent, the term "draft" angle means the angle defined by the surface of a mold and the theoretical plane along which a molded surface moves as it is withdrawn from the mold.

Figure 1:
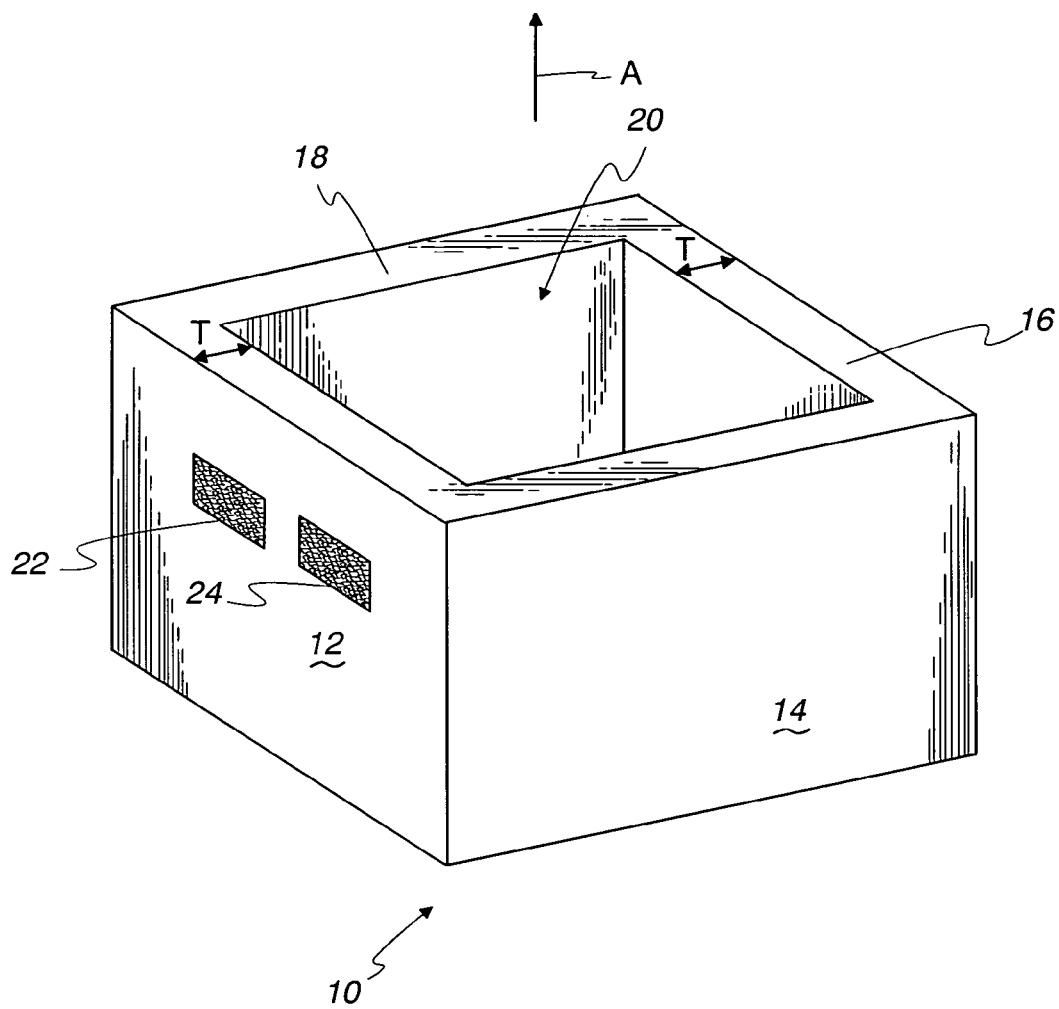
FIG. 1 is a perspective view of an article of the instant invention and made in accordance with the method and apparatus of the instant invention.

As illustrated in FIG. 1, an article 10 made in accordance with the invention can be in the form of a molded container, such as the container portion of an ice chest or picnic cooler. The container comprises four side walls 12, 14, 16, and 18 and a bottom wall, not shown, the four side walls and the bottom wall defining an opening 20. Each of the side walls is of a predetermined thickness "t" as shown at the top surface of side walls 12 and 16. On the external surface of side wall 12 are two fields of hooks, 22, 24, the fields of hooks being formed integrally and simultaneously with the injection molded article 10, the hooks being suited for releasable engagement with a cooperative loop-bearing member. The article 10 is made by injection molding in the mold cavity of an injection molding apparatus. The molded article is removed from the mold in the direction indicated by the arrow A. It may be seen that the direction A is not substantially normal to the base of the fields of hooks 22, 24. In fact, the bases of the fields of hooks 22, 24 lie in a plane substantially parallel to the direction of removal A.

Figure 2:
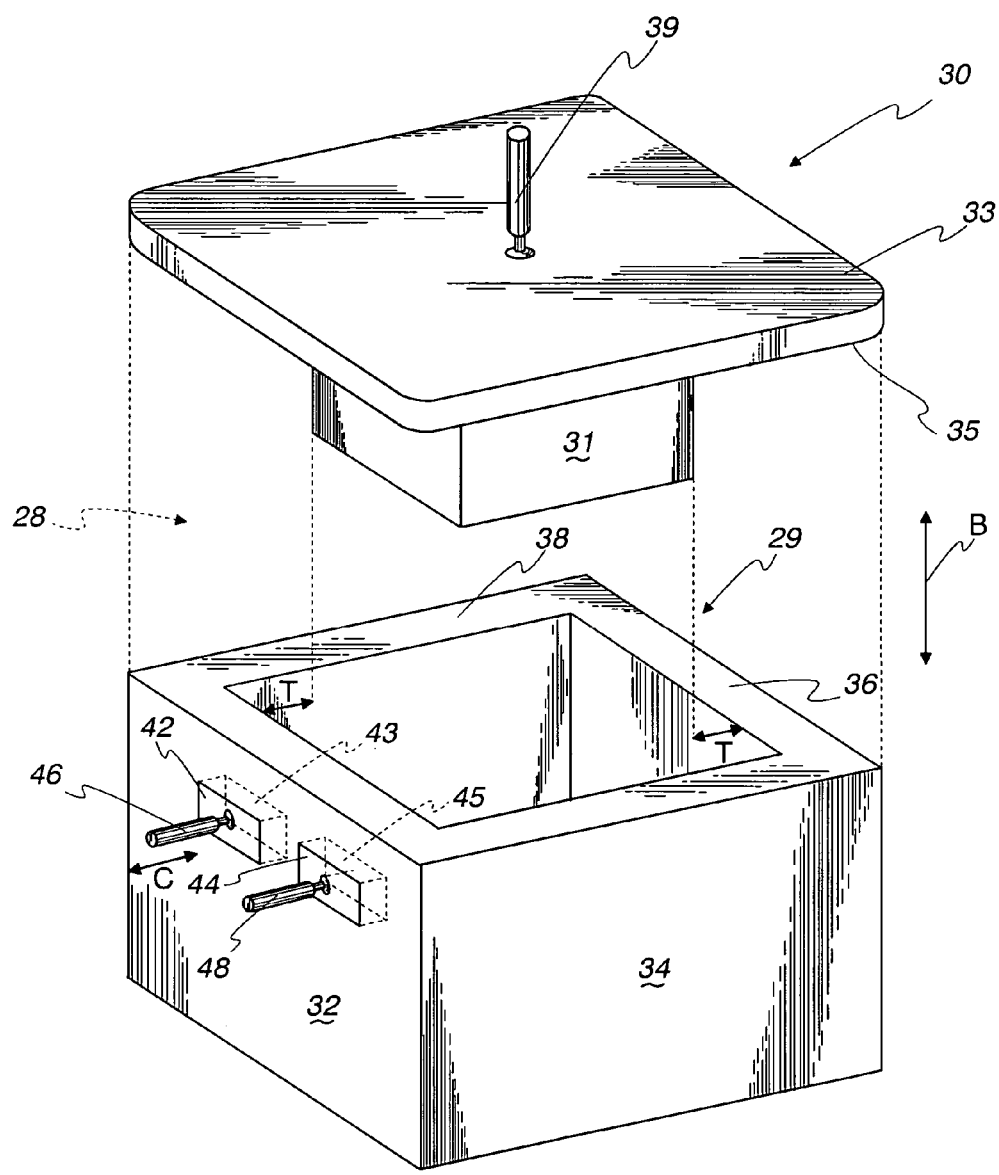
FIG. 2 is an exploded view of an embodiment of an apparatus of the instant invention.

FIG. 2 illustrates a two-part injection molding apparatus that can be used in the manufacture of article 10 of FIG. 1. Mold 28 comprises first part 29 and second part 30. First part 29 comprises four side walls 32, 34, 36, and 38, and a bottom wall, not shown, the four side walls and the bottom wall defining the outer walls of a cavity 40. Second part 30 comprises an inner member 31 that fits within cavity 40 such that the distance between the surfaces of the walls of inner member 31 and the inner surfaces of side walls 32, 34, 36, and 38 corresponds to the thickness "t" of the side walls 12, 14, 16, 18 of molded article 10. The distance between the bottom surface of member 31 and the top surface of the bottom wall of first part 29 corresponds to the thickness of the bottom wall of molded article 10. Second part 30 further comprises a sealing member 33 which has a bottom surface 35 that rests against the top surfaces of side walls 32, 34, 36, and 38 to define a sealed mold cavity into which molten thermoplastic can be injected by means known to those skilled in the art, and not illustrated. Second part 30 is moved in and out of cavity 40 of first portion 29 by retractor means 39, known to those skilled in the injection molding art, moving in the direction indicated by arrow B.

First mold portion 29 further comprises mold inserts 42, 44 that are inserted into apertures 52, 54 in side wall 32. Each mold insert 42, 44 has an inner surface 43, 45, illustrated in FIG. 2 in phantom lines, which inner surface is substantially contiguous with the inner surface of side wall 32. Each surface 43, 45 has formed therein a plurality of hook-shaped cavities; in a preferred embodiment, the inserts 42, 44 can comprise a plurality of stacked plates, each plate having one or more hook-shaped cavities formed in one edge thereof, the plates stacked together with or without spacer plates therebetween so that the edges with the hook-shaped cavities define a surface 43, 45.

Inserts 42, 44 can be positioned in side wall 32 or retracted therefrom by retractor means 46, 48, such as are known to those skilled in the art. In a preferred embodiment, such retractor means 46, 48 operate in accordance with the "core pull" technique well-known in the injection molding art. The retractor means 46, 48 can be operated hydraulically; alternatively, retractor means 46, 48 can be operated pneumatically, mechanically, electrically, or manually, in accordance with well-known core-pull techniques.

In accordance with the method of the invention, second part 30 is cooperatively positioned within first part 29 so as to define a sealed mold cavity having the shape of article 10, and inserts 42, 44 are positioned within side wall 32 in sealing engagement. A molten thermoplastic material is injected into the cavity by known means, not shown. The molten thermoplastic material fills the entire mold cavity, and flows into the hook-shaped cavities on the surface 43, 45 of mold inserts 42, 44. The injection molding apparatus 28 is operated through its heating and cooling cycles in a well-known manner to form the injection molded article 10, with the fields of molded hooks 22, 24 being integrally formed on side wall 12 in the areas corresponding to mold inserts 42, 44 in first mold section side wall 32.

After sufficient cooling, it is necessary to withdraw second mold part 30 is from first mold part 29 by the action of retractor means 39 operating in the direction of arrow B. Ordinarily, article 10 would be ready to be removed from first mold section 29. It will be appreciated, however, that the fields of hooks 22, 24 are still within the hook-shaped cavities of surfaces 43, 45 of mold inserts 42, 44, respectively. Therefore, before molded article 10 is removed from first mold portion 29, mold inserts 42, 44 are retracted from side wall 32 by retractor means 46, 48, which operate in accordance with understood core-pull techniques in the direction of arrow C in FIG. 2, which most preferably is substantially normal to the base of the field of hooks. Upon such retraction, the hooks eject from the hook-shaped cavities, during which ejection the hooks can partially straighten out, and then spring back to their molded curved shape. Although there may be some temporary deformation of the hooks due to the stresses occurring during ejection while the thermoplastic material is still hot, the hooks will soon return to substantially their original shape, due to the "memory" of the thermoplastic material. The hooks will not be subjected to ejection forces in the shear direction. Once the fields of hooks 22, 24 have been released from the hook-shaped cavities of the mold insert surfaces 43, 45, the molded article 10 can be removed from first mold portion 29 along the direction of arrow A without causing any further damage to the fields of hooks 22, 24.

Figure 3:
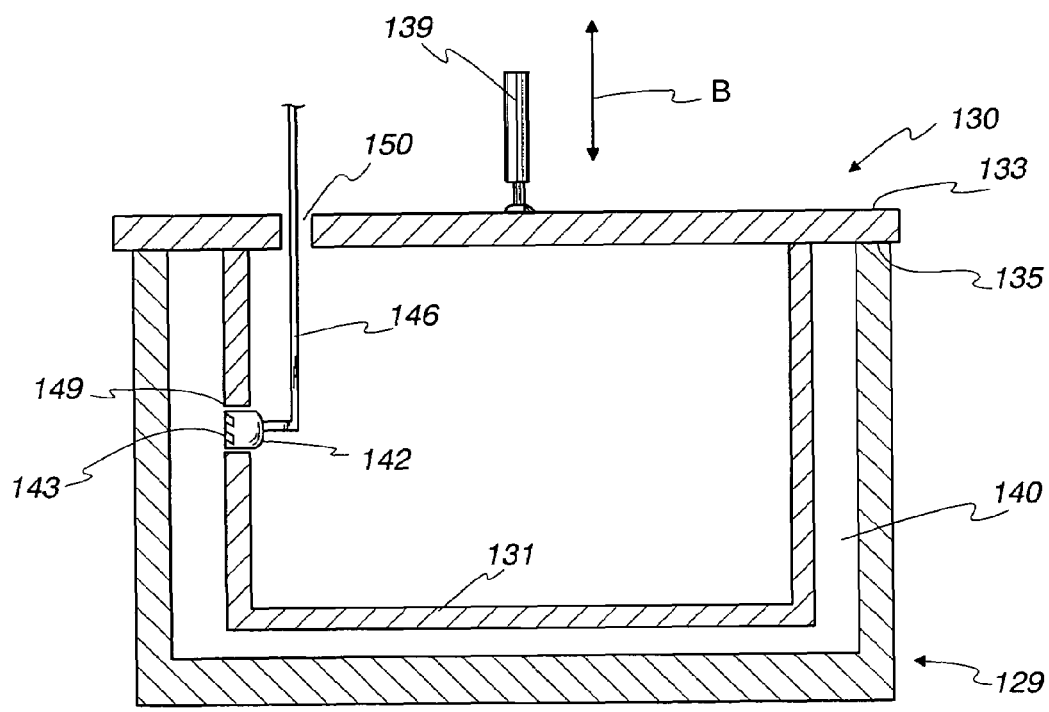
FIG. 3 is a cross-sectional assembled view of an alternative embodiment of an apparatus of the invention.

The foregoing description of a preferred embodiment describes an example in which the fields of hooks are formed on an outer surface of the molded article. For some embodiments, it may be desirable to have one or more fields of hooks formed on an inner surface of the molded article. In the embodiment illustrated in FIG. 3, a mold for injection molding comprises first part 129 and second part 130. Member 131 fits within first part 129 to define a cavity 140 that will define the shape of the injection molded article, such that the outer surface of member 131 will define an inner surface of the molded article, such that the outer surface of member 131 will define an inner surface of the molded article. Second part 130 further comprises sealing member 133 that seals cavity 140 when the two parts are joined. Second part 130 is moved in and out of cooperative sealing relation with first part 129 by retractor means 139. Mold insert 142 has a field of hook cavities formed on surface 143. Mold insert 142 fits into aperture 149 in a wall of member 131 so that surface 143 is substantially contiguous with the outer surface of member 131. Thus, an article molded in the mold of FIG. 3 will have a field of hooks integrally formed on an inner surface thereof. When the molding operation is complete, mold insert 142 can be retracted from aperture 149 by retractor means 146, which extends through orifice 150 in sealing member 133. Thus, the hooks can be released from the hook-shaped cavities of insert 142 before member 131 is separated from the molded article, thus avoiding potentially damaging shear forces as the field of molded hooks is separated from the mold.

Thus there has been described an injection molded article having a field of injection molded hooks thereon wherein the base of the field of the injection molded hooks is not substantially normal to the direction in which the article is withdrawn from the mold. There also has been described a method and apparatus for making an injection molded article having a field of hooks on one surface thereof, wherein the base of the field of hooks is not substantially orthogonal to the direction in which the article is withdrawn from the mold. The foregoing specification describes only the embodiment of the invention shown and/or described. Other embodiments may be articulated as well. For example, while the invention has been described in terms of injection molding method and apparatus, the invention can be used with other known molding techniques, such as, for example, compression molding and blow molding. The terms and expressions used, therefore, serve only to describe the invention by example and not to limit the scope of the invention. It is expected that others skilled in the art will perceive other variations which, while different from the foregoing, do not depart from the scope of the invention described herein. In particular, any of the specific constructional elements described may be substituted for any other known element having equivalent function.

The invention claimed is:

1. A method of forming a molded article, the method comprising, providing a mold comprising two or more parts defining a mold cavity when said two or more parts are assembled, at least one of said parts having at least one aperture through a first wall thereof, providing at least one insert having a field of hook-shaped cavities on a surface thereof, said at least one insert being receivable in said at least one aperture, positioning said at least one mold insert in said at least one aperture such that said cavity-bearing surface of said mold insert is in communication with said mold cavity when said mold parts are assembled, assembling said two of more mold parts to define said mold cavity, molding an article in said mold cavity, said article having a field of molded hooks formed on a surface thereof, retracting said mold insert to release said molded hooks from said mold insert, and removing said molded article from said mold cavity in a removing direction, the angle between said removing direction and said first wall having said aperture therethrough being less than about 45°.

2. The method of claim 1 wherein said molding step is selected from the group consisting of injection molding, compression molding and blow molding.

3. The method of claim 1 wherein at least a portion of said molded article is generally in the configuration of an integrally molded box, and said hook-bearing surface of said molded article comprises a surface of a side of said box.

4. The method of claim 3 wherein said hook-bearing surface of said molded article comprises an inner surface of a side of said box.

5. The method of claim 3 wherein said hook-bearing surface of said molded article comprises an outer surface of a side of said box.

6. The method of claim 1 wherein said angle between said removing direction and said first wall having said aperture therethrough is substantially 0°.

7. In a method of forming a molded article, the method comprising the steps of (a) providing a mold comprising two or more parts defining a mold cavity, at least one of said parts comprising a first wall having at least one aperture therein, (b) providing at least one insert having a field of hook-shaped cavities on a surface thereof, said at least one insert being receivable in said at least one aperture, (c) positioning said at least one mold insert in said at least one aperture such that said cavity-bearing surface of said mold insert is in communication with said mold cavity when said mold parts are assembled, (d) assembling said two of more mold parts to define a mold cavity, (e) molding an article in said mold cavity, said article having a field of molded hooks formed on a surface thereof to define a hook-bearing surface, and (f) removing said molded article from said mold cavity in a removing direction, the improvement comprising the angle between said removing direction and said first wall of said mold part being less than about 45°, the method including the further step of retracting said mold insert to release said molded hooks from said mold insert prior to removing said molded article from said mold cavity.

* * * * *